United States Patent
Lebaudy et al.

[11] Patent Number: 6,068,291
[45] Date of Patent: May 30, 2000

[54] ADAPTIVE PYROTECHNIC GAS GENERATOR WITH TUBULAR CHAMBERS, FOR AIRBAGS

[75] Inventors: Franck Lebaudy, Lardy; Christian Perotto, Ballancourt, both of France

[73] Assignee: Livbag SNC, Vert Le Petit, France

[21] Appl. No.: 09/083,102

[22] Filed: May 22, 1998

[30] Foreign Application Priority Data

May 23, 1997 [FR] France .................................. 97 06324

[51] Int. Cl.[7] .................................................. B60R 21/26
[52] U.S. Cl. ......................... 280/736; 280/741; 102/531; 102/217
[58] Field of Search .................................. 280/736, 740, 280/741, 742; 102/530, 531, 217

[56] References Cited

U.S. PATENT DOCUMENTS

| | | |
|---|---|---|
| 3,773,352 | 11/1973 | Radke . |
| 3,972,545 | 8/1976 | Kirchoff et al. . |
| 5,622,380 | 4/1997 | Khandhadia et al. .................. 280/736 |
| 5,631,439 | 5/1997 | Sallee et al. .............................. 102/530 |

FOREIGN PATENT DOCUMENTS

| | | |
|---|---|---|
| 0 382 552 A2 | 8/1990 | European Pat. Off. . |
| 0 609 981 A2 | 8/1994 | European Pat. Off. . |
| 773145 | 5/1997 | European Pat. Off. . |
| 19541583 | 5/1997 | Germany . |
| 9716695 | 5/1997 | WIPO . |

*Primary Examiner*—Peter C. English
*Attorney, Agent, or Firm*—Pillsbury Madison & Sutro LLP

[57] ABSTRACT

A pyrotechnic gas generator (1) for airbags comprising housing (2) which has a side wall (3) closed at its two ends. A traverse plate (6) divides the housing (2) into an upstream part (9) and a downstream part (10). The upstream part (9) contains a tube (16) which seperates, in a gas-tight manner, two combustion chambers (17, 18), each one provided with a pyrotechnic charge (19, 20). An electrical ignition device (5) consists of an initiator with two heads (21, 22) may be incorporated in a switching bridge having four switches linked to a circuit with diodes. Thus, it is possible either to initiate only a single head (21, 22) as required, or to initiate both heads in a programmed time-staggered manner.

10 Claims, 2 Drawing Sheets

ADAPTIVE PYROTECHNIC GAS GENERATOR WITH TUBULAR CHAMBERS, FOR AIRBAGS

BACKGROUND OF THE INVENTION

The invention relates to the field of motorvehicle safety and relates more particularly to pyrotechnic gas generators for inflating airbags.

New generators, called adaptive generators, have recently appeared so as to limit the risk of injuries to the body which are caused by the airbag being deployed under exceptional conditions. These generators, combined with suitable detection systems, allow the gas flow rate to be modulated depending on various parameters such as, for example, the ambient temperature, the nature and intensity of the impact, and the morphology and position of the passenger. In order to construct "adaptive" generators, it is possible to use, on the one hand, hybrid-type generators, i.e. generators whose gas intended to inflate the airbag consists of a mixture of the gas coming from combustion of the pyrotechnic charge and the gas stored in a pressurized container, and on the other hand, generators whose single combustion of the pyrotechnic charge or charges allows the airbag to be deployed. U.S. Pat. No. 3,972,545 describes a "passenger" generator which comprises two combustion chambers each one provided with a pyrotechnic charge and with an initiator, the two chambers being separated by a consumable partition. Depending on the intensity of the impact, the actuation of the two initiators connected to a single power supply can be staggered. When a low-voltage electrical signal is emitted, only one chamber is ignited by means of the initiator which it contains, the second chamber being ignited when the partition separating the two chambers has been consumed. On the other hand, when a high-voltage signal is emitted, the two initiators are actuated simultaneously, thus resulting in simultaneous ignition of the two combustion chambers. It therefore follows that the volume of gas released into the airbag is constant and inflates it to the maximum amount under all circumstances.

Patent Application EP 609,981 defines a "driver" gas generator which makes it possible to vary the time of combustion of the pyrotechnic charge by means of two initiators which can be fired successively or simultaneously. However, on the one hand, the use of two independent and separate initiators also requires separate power supplies, thus increasing the cost and the amount of space required, and, on the other hand, the volume of gas generated is constant under all circumstances.

Patent Application EP 0,382,552 discloses a generator more especially designed to protect a passenger. This generator consists of a monobloc cylindrical piece divided into two parts by an internal partition and has two combustion chambers, each one containing a pyrotechnic charge and an initiator, each initiator being connected to a separate power supply. In operation, the two chambers are ignited at staggered times so as to optimize the gas flow rate and therefore the pressure level obtained in the airbag.

Thus, these generators allowing the rate of inflation of the airbag to be modulated cannot, depending on the circumstances, reduce the final volume of gas released into the airbag. Moreover, the relatively complex process for manufacturing these generators and, where appropriate, the use of separate power supplies make it difficult to transfer such technologies for making compact low-cost generators.

Those skilled in the art are therefore looking for a pyrotechnic gas generator which is easy and inexpensive to manufacture and makes it possible, depending on the situation, either to release only a certain volume of gas and therefore to inflate the airbag only partially, or to release the maximum volume of gas so as to inflate the airbag fully, with the possibility of adjusting the rate of inflation.

SUMMARY OF THE INVENTION

The invention therefore relates to a pyrotechnic gas generator intended for motor-vehicle safety, consisting in particular of a cylindrical housing comprising a side wall, one of the two ends of which is closed by a closure ring, and an electrical ignition device having two separate ignition heads, characterized in that:

i) a transverse plate having initially closed-off orifices divides the said housing into an upstream part and a downstream part;

ii) the housing contains, in its upstream part, a tube making it possible to separate in a gas-tight manner a main combustion chamber from an auxiliary combustion chamber, the two chambers each containing a pyrotechnic charge and an ignition head; and iii) the downstream part of the housing is provided with combustion-gas exhaust vents.

According to one particular embodiment, the housing may consist of a tube, one of the two ends of which is closed by a closure ring and the other end of which is closed by a piece which is added.

Advantageously, the axis of revolution of the tube is parallel to and offset with respect to that of the housing, it being possible for this tube to be covered by a heat shield and/or to include arrangements so as to provide complete safety in terms of gas-tightness and thus avoid any ignition by heat transfer without the two ignition heads being actuated.

According to a first characteristic of the invention, a safety device makes it possible to isolate each one of the two combustion chambers from the gas emanating from the other combustion chamber. Preferably, the safety device consists of a discoid piece which has prescored regions and which is housed in the downstream part so that each one of the orifices in the transverse plate is covered by one of the prescored regions. It is also possible to form a safety device by closing off each orifice with a clip inserted into convergent grooves made on either side of each orifice. This safety device thus makes it possible:

either to release only a limited volume of gas, by initiating only one of the two pyrotechnic charges, or to inflate the airbag fully, by initiating both charges, initiation staggered in time allowing the rate of inflation to be modulated.

According to a second characteristic of the invention, a diaphragm covers the transverse plate in the upstream part of the housing. This diaphragm therefore closes off the orifices in the transverse plate and acts as burstable covers.

According to a third characteristic of the invention, the electrical ignition device consists of an initiator with two heads, the said initiator having only a single power supply.

According to a first preferred embodiment, each one of the two heads has a separate resistor incorporated in a switching bridge. The latter is composed of four switches which can be switched in pairs and are linked to a routing circuit formed by a circuit with diodes. This system, by closing the suitable pair or pairs of switches, therefore allows either ignition of only a single combustion chamber, as required, or ignition of both chambers in a programmed time-staggered manner.

Preferably, the switches are included in an electronic control box which is connected., by means of the single power supply terminating in two connection pins, to an ignition support plate having the resistors and the diodes, the said pins, resistors and diodes being integrated in a printed circuit. Depending on the geometry of the ignition support plate, which can for instance be circular, annular or rectangular, it is then necessary to use a flexible printed circuit or a rigid printed circuit. Advantageously, the four switches consist of transistors capable of being incorporated into a single module.

According to a second preferred embodiment, each one of the two heads has a resistor of different value. As the two heads are initiated by the same electric current, it is thus possible, depending on the resistors employed and on the intensity of the current delivered by an electronic control box, either to actuate only one of the two chambers or to actuate both combustion chambers simultaneously or successively.

Preferably, the pyrotechnic charge consists of a solid propellant in the form of pellets or in the form of a block, based on a composite propellant or a double-base propellant, or else a propellant based on sodium azide. The amount of solid propellant in each chamber may be the same or different.

The main advantages of this generator compared to the existing ones are the following:

this generator can be used to inflate both "driver" and "passenger" airbags. To do this, all that is required is to match the length of the side wall of the housing and that of the internal tube to the mass of propellant necessary to inflate the airbag;

this generator can be manufactured for a lower cost because, on the one hand, of the use of tubes instead of forgings or machined components and of the use of a double-headed initiator provided with a single power supply instead of two initiators having two independent circuits and because, on the other hand, it is simple to assemble, requiring only two annular crimping operations, one at the transverse plate and the other at the closure ring.

BRIEF DESCRIPTION OF THE DRAWINGS

Given below is a detailed description of the preferred embodiment with reference to FIG. 1 to 5.

DETAILED DESCRIPTION OF THE INVENTION

Figure 1:
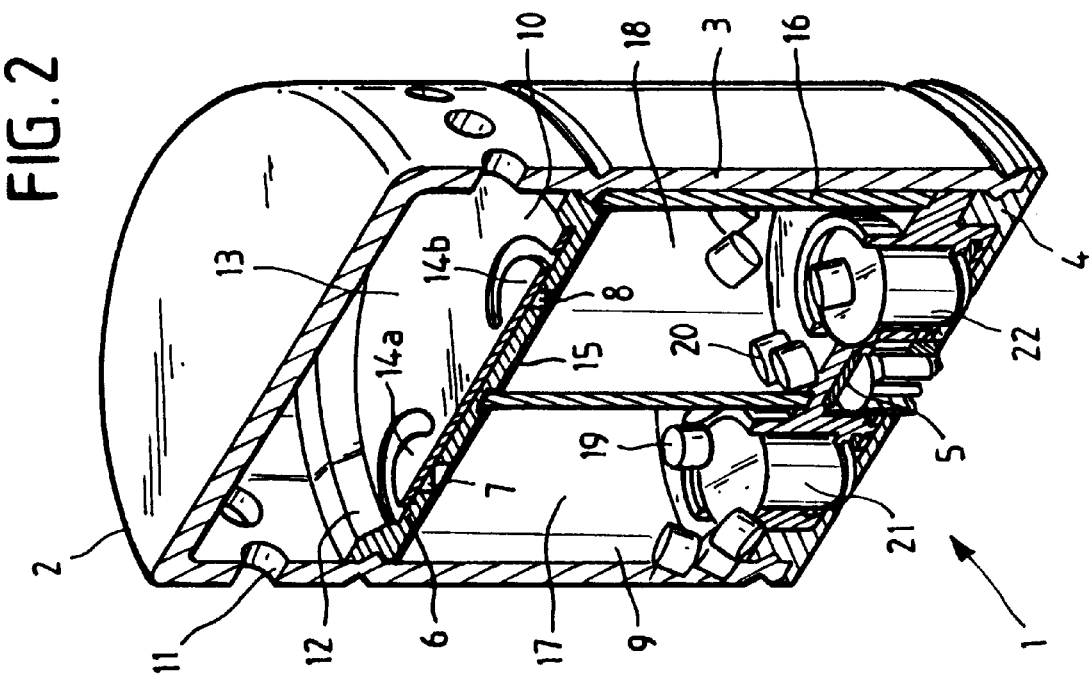
FIG. 1 is a longitudinal sectional view of a generator according to the invention.
Figure 2:
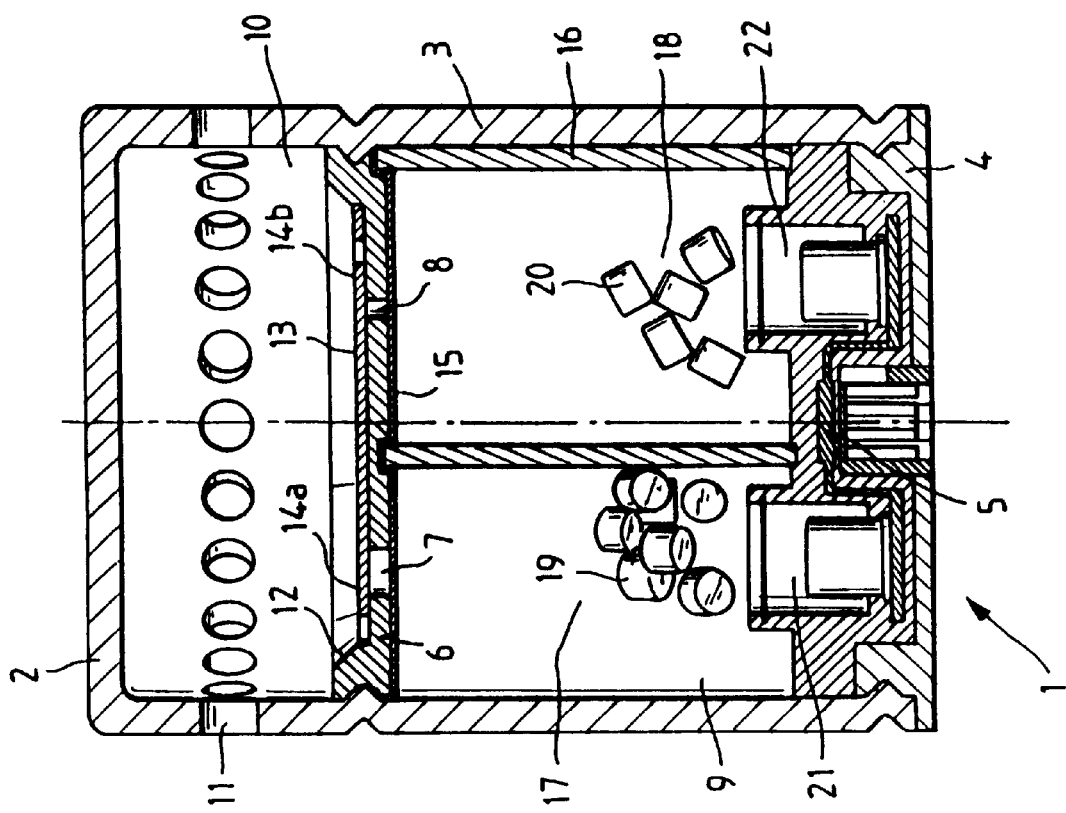
FIG. 2 is a partial perspective view of the generator illustrated in FIG. 1.

Referring to FIGS. 1 and 2, it will be seen that a pyrotechnic gas generator 1 consists of a monobloc cylindrical housing 2 made of a metal which is sufficiently ductile to be able to be crimped, i.e. a metal whose elongation and tensile strength are greater than 20% and 400 MPa, respectively. This housing 2 comprises a side wall 3 which has a closed end and, opposite it, an open end into which a closure ring 4 serving as a support for an electrical ignition device 5 is crimped. A transverse plate 6 having two orifices 7, 8 is crimped into the internal side wall 3 of the housing 2 and divides the latter into an upstream part 9 and a downstream part 10, the side wall 3 lying in the said downstream part 10 being provided with combustion-gas exhaust vents 11. This transverse plate 6 has, in the downstream part 10, a face with a recess 12 in which a discoid piece 13 having two prescored regions 14a, 14b is housed. These prescored regions are positioned so that each one of the orifices 7, 8 in the said plate 6 is covered by one of the prescored regions 14a, 14b. A metal diaphragm 15, the rim of which is pinched between the side wall 3 and the plate 6 at the point of crimping, covers the said plate 6 in the upstream part 9 and thus closes off the orifices 7, 8. The housing 2, in the upstream part 9, contains a cylindrical tube 16 having, on the one hand, a first end inserted into a groove in the electrical ignition device 5, and on the other hand, a second end in contact with the diaphragm 15 and inserted into a groove in the plate 6. The axis of revolution of the tube 16, which is parallel to the axis of revolution of the housing 2, is not coincident with the latter, and the said tube 16 thus separates, in a gas-tight manner, a main combustion chamber 17 from an auxiliary combustion chamber 18. These two chambers 17, 18 contain a pyrotechnic charge 19, 20, respectively, consisting of a solid propellant in the form of pellets which is based on a composite propellant containing a binder, an oxidant and additives, the amount of solid propellant contained in the main chamber 17 being greater than that contained in the auxiliary chamber 18.

Referring to FIGS. 1 to 5, it will be seen that the electrical ignition device 5 consists of an initiator with two heads 21, 22, this initiator being supplied by means of a single electrical circuit within an electronic control box. The heads 21, 22 are housed in the main chamber 17 and the auxiliary chamber 18, respectively, and each head 21, 22 has a separate resistor $A_1$, $A_2$. The latter are incorporated in a switching bridge comprising four switches $Q_1$ to $Q_4$, included in the electronic control box, which can switch in pairs and which are linked to a circuit with diodes $D_1$, $D_2$.

Figure 5:
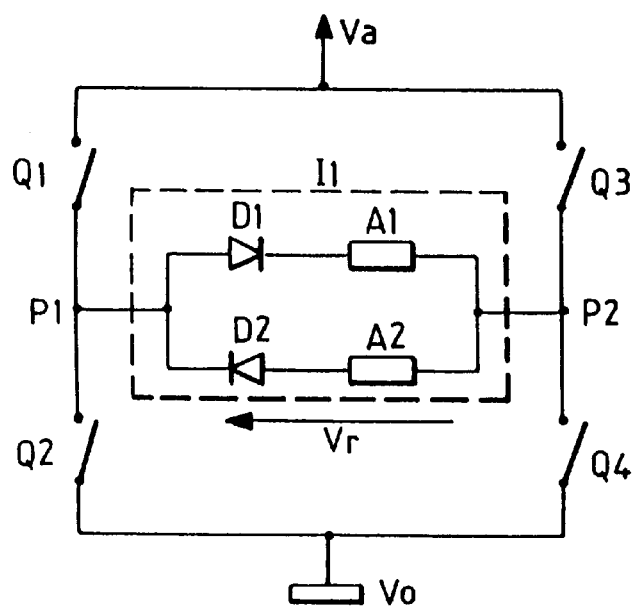
FIG. 5 is a circuit diagram of the electrical ignition device of the generator illustrated in FIGS. 1 and 2.

As shown in FIG. 5, each pair of switches $Q_1$, $Q_4$ and $Q_2$, $Q_3$ is connected between a firing voltage Va and the circuit's electrical earth Vo. The electrical circuit within the electronic control box is connected to the electrical ignition device 5 by means of two pins $P_1$, $P_2$ which are connected to an initiation unit $I_1$ composed, on the one hand, of the resistors $A_1$, $A_2$ and, on the other hand, of the diodes $D_1$, $D_2$ which are associated with them and which isolate one of the two resistors $A_1$, $A_2$ depending on the polarity of the firing voltage Vr applied across the pins $P_1$, $P_2$.

Figure 3:
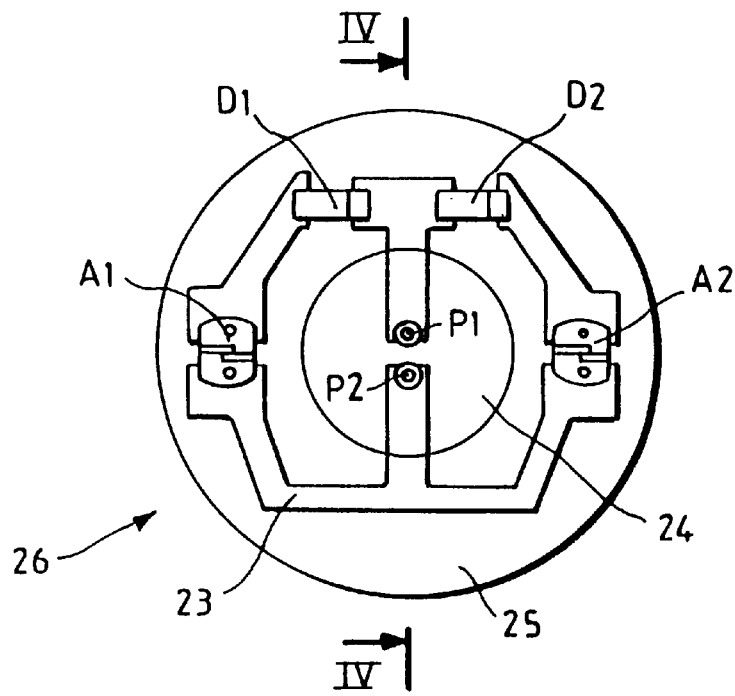
FIG. 3 is a view of the underside of the ignition support plate of the generator illustrated in FIGS. 1 and 2.
Figure 4:
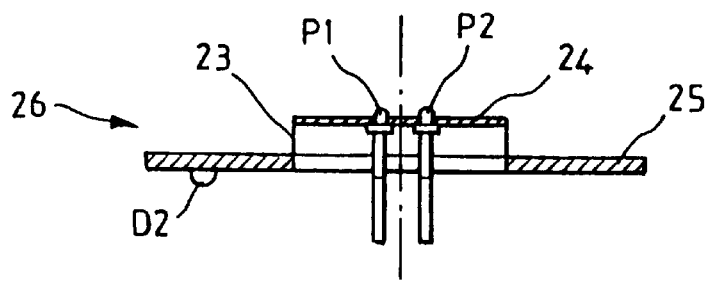
FIG. 4 is a front view, on the section IV-IV, of the ignition support plate illustrated in FIG. 3.

Referring to FIGS. 3 and 4, it will be seen that the pins $P_1$, $P_2$ the resistors $A_1$, $A_2$ and the diodes $D_1$, $D_2$ are mounted on a flexible printed circuit 23 which connects a discoid support 24 to a small annular plate 25, the said support 24 and the said small plate 25 lying in planes which are parallel, but offset, and forming, with the printed circuit 23, an ignition mounting plate 26. The connection pins $P_1$, $P_2$ are embedded in the support 24 and the resistors $A_1$, $A_2$ together with the diodes $D_1$, $D_2$ are mounted on the small plate 25. This arrangement thus makes it possible to decrease the height of the initiator 5 and therefore that of the generator 1, since the connection between the electrical circuit and the generator 1 is partially set into the said initiator 5.

Advantageously, the switches $Q_1$ to $Q_4$ included in the electronic control box consist of transistors which can be transposed into a single module.

This generator 1, associated with a multi-function electronic control box, allows the following operating scenarios.

Depending on the circumstances of the accident, the electronic control box is designed to actuate only one of the two heads 21, 22 as required or else, if necessary, to actuate both heads 21, 22 in a time-staggered manner.

In the first case, the chosen head of the initiator 5 is that whose pyrotechnic charge associated with it will generate the volume of gas best suited to the situation. By way of example, if the pair c)f switches $Q_1$, $Q_4$ is closed and if the pair of switches $Q_2$, $Q_3$ remains open, the polarity of the voltage Vr is then positive and the diode $D_1$ conducts. Consequently, the resistor $A_1$ is exposed to the electric current and the head 21 of the main chamber 17 is fired. On the other hand, the diode $D_2$ is turned off and therefore the resistor $A_2$ is not exposed to the electric current. The combustion gas generated by the head 21 then comes into contact with the pellets 19 and causes ignition of the said pellets 19. When the pressure reaches the rupture value of the diaphragm 15 which closes off the orifice 7, the said diaphragm 15 ruptures near the latter and the gas then exerts a pressure on the prescored region 14a which covers the orifice 7, thereby folding the latter back in the direction of the gas flow. The gas then enters the downstream part 10 of the housing 2 before finally escaping via the combustion-gas exhaust vents 11 and inflating the airbag. The discoid piece 13, the prescored region 14b of which covers the orifice 8, then prevents the hot gas generated by the combustion of the pellets 19 from rupturing the diaphragm 15 near the orifice 8 and consequently igniting the pellets 20. The operation is similar when the electronic control box actuates only the head 22 of the initiator 5 by closing the pair of switches $Q_{21}$ $Q_3$.

In the second case, the two heads 21, 22 are fired at different times by firstly closing the first pair of switches, for example as previously the pair $Q_1$, $Q_4$, and then by closing the second pair $Q_2$, $Q_3$. The head 21 is fired, as described previously, and then the head 22 is therefore initiated after the head 21, according to a programmed delay. The pellets 20 are thus ignited and, when the pressure reaches a threshold value, the diaphragm 15 ruptures near the orifice 8. The gas generated then exerts a pressure on the prescored region 14b which covers the orifice 8, thereby causing the latter to be folded back in the direction of the gas flow. The gas thus enters the downstream part 10 of the housing 2 before eventually inflating the airbag. It should be noted that since the response time of a diode is about 1 to 2 milliseconds, the two heads 21, 22 can be initiated almost simultaneously.

What is claimed is:

1. Pyrotechnic gas generator (1) intended for motor-vehicle safety, comprising a cylindrical housing (2) having a side wall (3), one of the two ends of which is closed by a closure ring (4), and an electrical ignition device (5) having two separate ignition heads (21, 22), characterized in that:

i) a transverse plate (6) having initially closed-off orifices (7, 8) divides said housing (2) into an upstream part (9) and a downstream part (10);

ii) the housing (2) contains, in its upstream part (9), a tube (16) separating in a gas-tight manner a main combustion chamber (17) from an auxiliary combustion chamber (18), the two combustion chambers (17, 18) each containing a pyrotechnic charge (19, 20) and one of the ignition heads (21, 22); and iii) the downstream part (10) of the housing (2) is provided with combustion-gas exhaust vents (11).

2. Generator according to claim 1, characterized in that an axis of revolution of the tube (16) is parallel to and offset with respect to that of the housing (2).

3. Generator according to claim 1, characterized in that a safety device isolates each one of the two combustion chambers (17, 18) from the gas emanating from the other combustion chamber.

4. Generator according to claim 3, characterized in that the safety device comprises a discoid piece (13) which has prescored regions (14a, 14b) and which is housed in the downstream part (10) so that each one of the orifices (7, 8) in the transverse plate (6) is covered by one of the prescored regions (14a, 14b).

5. Generator according to claim 1, characterized in that a diaphragm (15) covers the transverse plate (6) in the upstream part (9) of the housing (2).

6. Generator according to claim 1, characterized in that the electrical ignition device (5) comprises an initiator with the two heads (21, 22), said initiator having only a single power supply.

7. Generator according to claim 6, characterized in that each one of the two heads (21, 22) has a separate resistor ($A_1$, $A_2$) incorporated in a switching bridge comprising four switches ($Q_1$ to $Q_4$) which can be switched in pairs and are linked to a routing circuit formed by a circuit with diodes ($D_1$, $D_2$).

8. Generator according to claim 7, characterized in that the switches ($Q_1$ to $Q_4$) are included in an electronic control circuit which is connected, by means of a single power supply terminating in two connection pins ($P_1$, $P_2$), to an ignition support plate (26) having the resistors ($A_1$, $A_2$) and the diodes ($D_1$, $D_2$), the said pins ($P_1$, $P_2$), resistors ($A_1$, $A_2$) and diodes ($D_1$, $D_2$) being integrated in a printed circuit (23).

9. Generator according to claim 7 or claim 8, characterized in that the four switches ($Q_1$ to $Q_4$) comprises transistors capable of being incorporated into a single module.

10. Generator according to claim 6, characterized in that each one of the two heads (21, 22) has a resistor of different value.

* * * * *